(12) United States Patent
Wang et al.

(10) Patent No.: US 8,559,670 B2
(45) Date of Patent: Oct. 15, 2013

(54) MOVING OBJECT DETECTION DETECTION WITHIN A VIDEO STREAM USING OBJECT TEXTURE

(75) Inventors: Jian-Cheng Wang, Hsinchu County (TW); Cheng-Chang Lien, Hsinchu County (TW); Ya-Lin Huang, Hualien County (TW); Yue-Min Jiang, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 776 days.

(21) Appl. No.: 12/700,706

(22) Filed: Feb. 4, 2010

(65) Prior Publication Data

US 2011/0116682 A1    May 19, 2011

(30) Foreign Application Priority Data

Nov. 19, 2009 (TW) .............................. 98139336 A

(51) Int. Cl.
*G06K 9/00* (2006.01)
(52) U.S. Cl.
USPC .......................................................... 382/103
(58) Field of Classification Search
USPC .......................... 382/103, 104, 170, 173, 228
See application file for complete search history.

(56) References Cited

U.S. PATENT DOCUMENTS

| | | |
|---|---|---|
| 5,083,860 A | 1/1992 | Miyatake et al. |
| 5,581,276 A | 12/1996 | Cipolla et al. |
| 2003/0156759 A1* | 8/2003 | Colmenarez et al. ......... 382/228 |
| 2005/0036658 A1 | 2/2005 | Gibbins et al. |
| 2007/0036432 A1 | 2/2007 | Xu et al. |
| 2009/0019375 A1 | 1/2009 | Garofalo |
| 2010/0046797 A1* | 2/2010 | Strat et al. ..................... 382/103 |

OTHER PUBLICATIONS

"Office Action of Taiwan Counterpart Application", issued on Jan. 14, 2013, p. 1-p. 8.

* cited by examiner

*Primary Examiner* — Claire X Wang
(74) *Attorney, Agent, or Firm* — Jianq Chyun IP Office

(57) ABSTRACT

An object detection method and an object detection system, suitable for detecting moving object information of a video stream having a plurality of images, are provided. The method performs a moving object foreground detection on each of the images, so as to obtain a first foreground detection image comprising a plurality of moving objects. The method also performs a texture object foreground detection on each of the images, so as to obtain a second foreground detection image comprising a plurality of texture objects. The moving objects in the first foreground detection image and the texture objects in the second foreground detection image are selected and filtered, and then the remaining moving objects or texture objects after the filtering are output as real moving object information.

23 Claims, 6 Drawing Sheets

MOVING OBJECT DETECTION DETECTION WITHIN A VIDEO STREAM USING OBJECT TEXTURE

CROSS-REFERENCE TO RELATED APPLICATION

This application claims the priority benefit of Taiwan application serial no. 98139336, filed on Nov. 19, 2009. The entirety of the above-mentioned patent application is hereby incorporated by reference herein and made a part of specification.

BACKGROUND

1. Field

The disclosure is related to an object detection method and an object detection system applying a background probability model and a dynamic texture model.

2. Description of Related Art

Along with the advance of technology, environmental safety and self safety draw more and more attention. The research on video surveillance is even more emphasized. Not only the research on video surveillance and recording makes progress, but also technology of video intelligence grows up with each day. How to precisely grasp an occurrence of an event at a very moment and take corresponding actions has become a major issue in the research of the video intelligence.

In the process of video intelligence, a lack of fast accommodation to climate or natural phenomena always results in redundant detection errors and raises disturbance or even panic. Therefore, how to provide an accurate intelligent surveillance result and overcome all kinds of problems resulted from the climate and environment has become a basic requirement for the technology of video intelligence.

The ordinary detection technique usually emphasizes on the segmentation of a foreground and a background instead of paying attention to each kind of phenomenon in a crowd scene. These techniques comprise, for example: a background subtraction method that has a fast calculation speed but is easily interfered by environmental noise; a temporal differencing method that executes a difference analysis by using continual frames or frames in a fixed time interval; or an optical flow method that is able to overcome a variation of a light shadow in the environment but require considerable calculation. However, an accuracy of the detection using the temporal differencing method is easily affected under a crowd scene because of the comparison frequency. The optical flow method is unable to filter out redundant moving objects resulted from the natural phenomena. On the other hand, current academic research uses a local binary pattern (LBP) algorithm for object detection. However, in this algorithm, once the object stops moving, an accuracy of the detection reduces rapidly, which is unable to respond to a real condition.

SUMMARY

The present disclosure is related to an object detection method, which can increase an accuracy of object detection in a crowd scene.

The disclosure is related to an object detection system, which fuses information of a background probability model and a dynamic texture model to filter out an erroneous foreground resulted from natural phenomena.

The disclosure provides an object detection method, suitable for detecting moving object information in a video stream comprising a plurality of images. In the method, a moving object foreground detection is performed on each of the images to obtain a first foreground detection image comprising a plurality of moving objects. Meanwhile, a texture object foreground detection is performed on each of the images to obtain a second foreground detection image comprising a plurality of texture objects. Then, the moving objects in the first foreground detection image and the texture objects in the second foreground detection are selected and filtered, and remaining moving objects or texture objects after the filtering are outputted as the moving object information.

The present disclosure provides an object detection system, which comprises an image capturing device and a processing device. The image capturing device is used for capturing a video stream comprising a plurality of images. The processing device is coupled to the image capturing device and used for detecting moving object information in the video stream. The processing device further comprises a moving object detection module, a texture object detection module and an object filtering module. The moving object detection module is used for performing a moving object foreground detection on each of the images to obtain a first foreground detection image comprising a plurality of moving objects. The texture object detection module is used for performing a texture object foreground detection on each of the images to obtain a second foreground detection image comprising a plurality of texture objects. The object filtering module is used for filtering the moving objects in the first foreground detection image and the texture objects in the second foreground image, and outputting remaining moving objects or texture objects after the filtering as the moving object information.

Based on the above, the object detection method and the object detection system of the disclosure fuses information of a background probability model and a dynamic texture model to filter redundant moving objects resulted from natural phenomena. Therefore, an erroneous foreground resulted from the natural phenomena can be filtered out and an accuracy of object detection in a crowd scene can be increased.

In order to make the aforementioned and other features and advantages of the disclosure comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the disclosure.

DESCRIPTION OF THE EMBODIMENTS

To seek for an intelligent detection method that can fast accommodate to environment and filter out objects resulted from natural phenomena, the disclosure integrates advantages of the detection using a background probability model (BPM) and a dynamic texture model (DTM) to overcome the detection defects in the crowd scene, so as to precisely detect the moving objects. In addition, the disclosure also filters out an erroneous foreground resulted from natural phenomena in the detected objects, so as to provide the subsequent tracking and alerting mechanism with an ability to recognize different targets.

Figure 1:
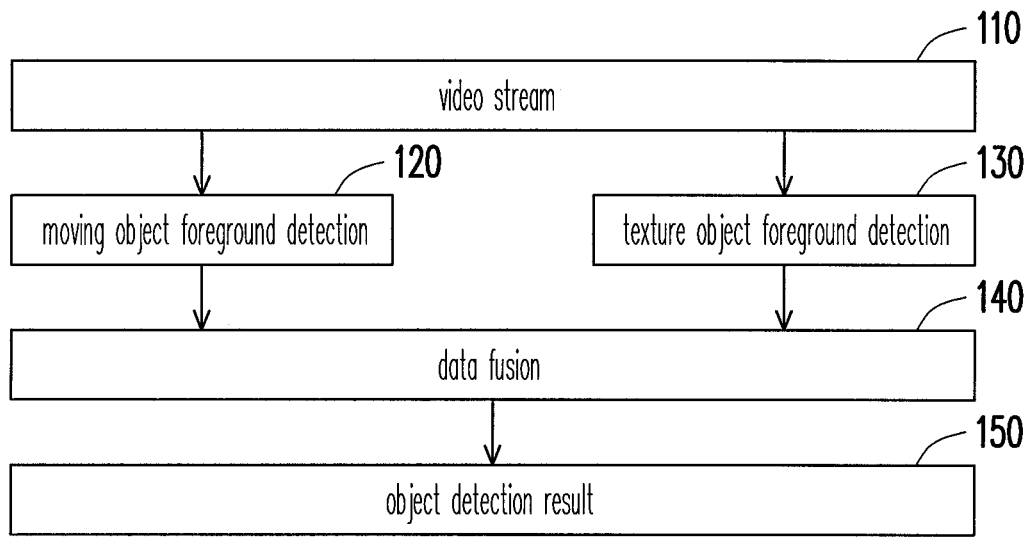
FIG. 1 is a schematic diagram illustrating a structure of an object detection system according to one embodiment of the disclosure.

FIG. 1 is a schematic diagram illustrating a structure of an object detection system according to one embodiment of the disclosure. Referring to FIG. 1, since the background probability model is easily affected by redundant moving objects resulted from natural phenomena which reduce the accuracy of object detection thereof and the dynamic texture model may have object lost because the information obtained from the objects is not enough, the object detection system of the present embodiment takes use of the background probability model and the dynamic texture model to respectively perform an moving object foreground detection 120 and an texture object foreground detection 130 on the received video stream 110 and fuses the data of these two foreground detection to form a final object detection result 150, such that an interference resulted from natural phenomena can be filtered out and an accuracy of object detection can be increased.

Figure 2:
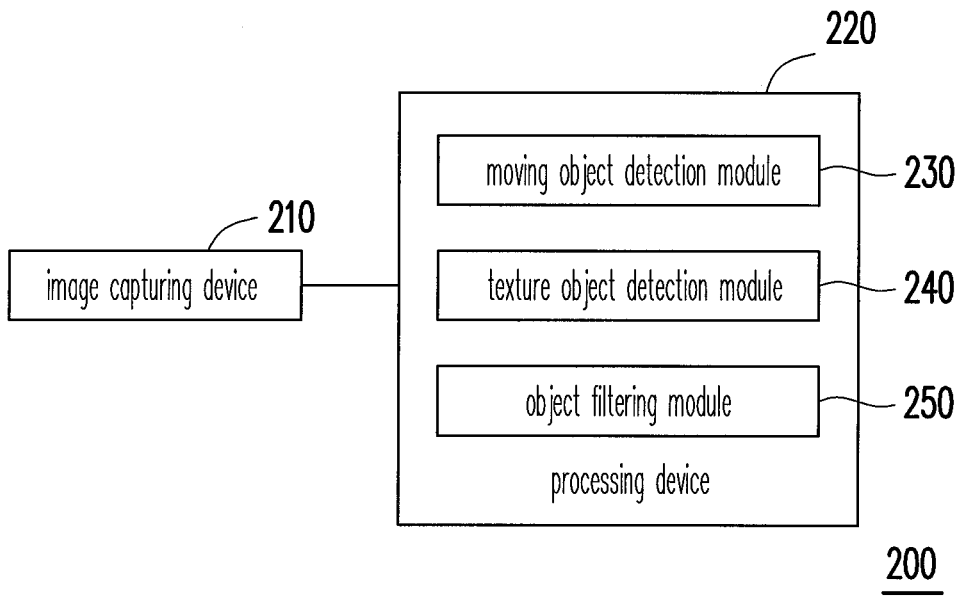
FIG. 2 is a block diagram illustrating an object detection system according to one embodiment of the disclosure.
Figure 3:
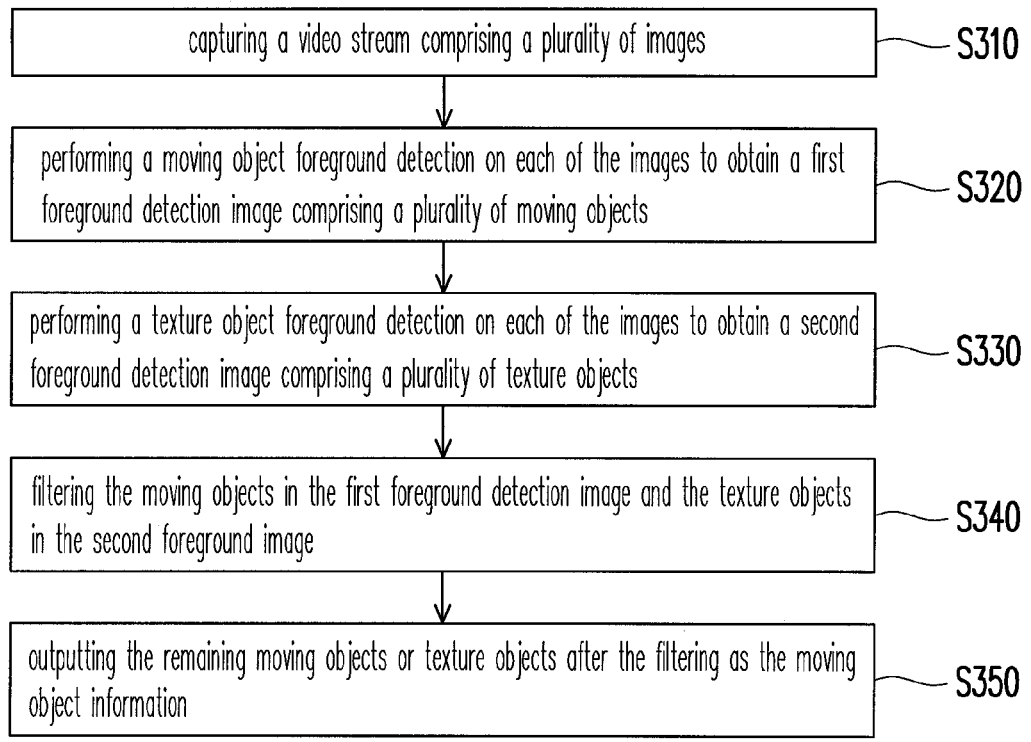
FIG. 3 is a flowchart illustrating an object detection method according to one embodiment of the disclosure.

FIG. 2 is a block diagram illustrating an object detection system according to one embodiment of the disclosure, and FIG. 3 is a flowchart illustrating an object detection method according to one embodiment of the disclosure. Referring to both FIG. 2 and FIG. 3, the object detection system 200 of the present embodiment comprises an image capturing device 210 and a processing device 220. The processing device 220 is coupled to the image capturing device 210 and can be separated into a moving object detection module 230, a texture object detection module 240 and an object filtering module 250. Detailed steps of the object detection method of the embodiment are described below with reference to the aforesaid components of the object detection system 200.

First, the image capturing device 210 captures a video stream comprising a plurality of images (S310). The image capturing device 210 is, for example, a surveillance equipment such as a closed circuit television (CCTV) or an IP camera and used for capturing an image of a specific region for surveillance. After being captured by the image capturing device 210, the video stream is then transmitted to the processing device 220 through a wired or a wireless means for subsequent procedures.

It should be noted herein that, in order to reduce the calculation for performing subsequent foreground detections, after capturing the video stream, the image capturing device 210 may reduce an image resolution of the images in the captured video stream by using a filter and provide the images having the reduced resolution for the processing device to perform the foreground detection, so as to reduce the calculation. The filter is, for example, a median filter or any other filters that can arbitrarily adjust the resolution, which is not limited by the present embodiment.

After receiving the video stream, the processing device 220 uses the moving object detection module 230 to perform a moving object foreground detection on each of the images, so as to obtain a first foreground detection image comprising a plurality of moving objects (S320). The present embodiment uses a fixed number of images as a basis in a statistics probability model to calculate a mean and a variation of pixel values of each pixel. The means that uses connected images as an updating basis for subsequent images can effectively eliminate possible errors resulted from minor changes in the background.

Figure 4:
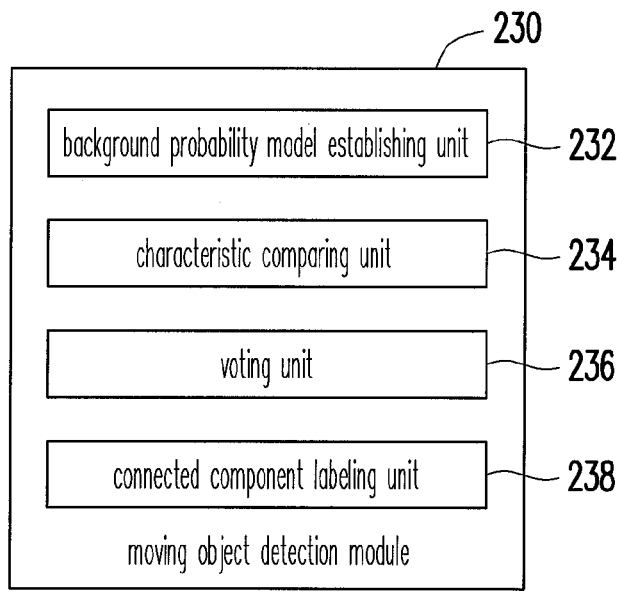
FIG. 4 is a block diagram of a moving object detection module according to one embodiment of the disclosure.
Figure 5:
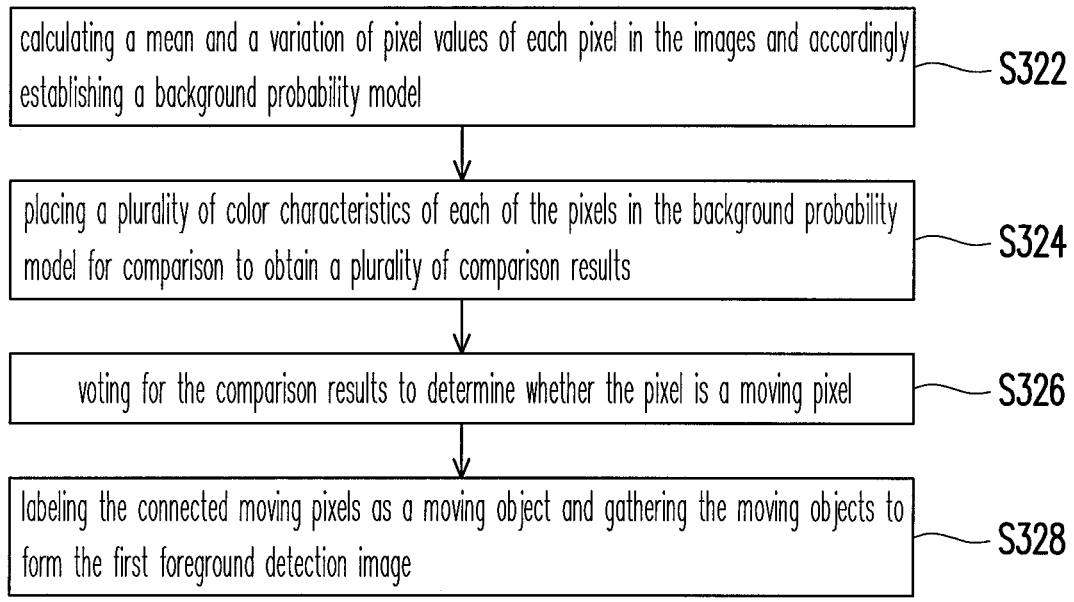
FIG. 5 is a flowchart illustrating a moving object detection method according to one embodiment of the disclosure.

In detail, FIG. 4 is a block diagram of a moving object detection module according to one embodiment of the disclosure, and FIG. 5 is a flowchart illustrating a moving object detection method according to one embodiment of the disclosure. Referring to both FIG. 4 and FIG. 5, the present embodiment separates the moving object detection module in FIG. 2 into a background probability model establishing unit 232, a characteristic comparing unit 234, a voting unit 236, and a connected component labeling unit 238, and functions thereof are respectively described as follows.

The background probability model establishing unit 232 performs processing on a plurality of consecutive images in the head of the video stream that is sent to the moving object detection module 230, so as to establish the background probability model. The background probability model establishing unit 232 may respectively calculate a mean and a variation of pixel values of each pixel in the images, and use the same as a basis to establish the background probability model (S322).

Next, the characteristic comparing unit 234 places a plurality of color characteristics of each of the pixels in the background probability model for comparison, so as to obtain a plurality of comparison results (S324). In detail, the characteristic comparing unit 234 places, for example, the color portions in different color spaces (e.g. Y, Cr, Cb) of each pixel in the background probability model for comparison and uses the result as a basis to determine the moving pixel. For example, if a mean of the pixel luminance is defined as μ and a variation of the pixel luminance is defined as δ in the background probability model, then the formula for determining the moving pixel can be defined as follows.

$$|I-\mu| > k \times \delta \tag{1}$$

Wherein, if the luminance I of a pixel satisfy the formula, it is determined that the pixel is a moving pixel.

After the comparison results for the color characteristics are obtained, the voting unit 236 executes a voting for the comparison results, so as to determine whether the pixel is a moving pixel (S326). In detail, the present embodiment votes for the comparison results for the color characteristics of a pixel, and chooses the comparison result that gets most votes as a basis to determine whether the pixel is a moving pixel (S326). For example, if the comparison results for color portions of Y and Cr of a pixel indicates the pixel is a moving pixel and the comparison result for color portion of Cb of the pixel indicates the pixel is not a moving pixel, then the voting chooses the comparison result of color portions of Y and Cr and determines that the pixel is a moving pixel.

After the moving pixels are determined through aforesaid steps, the connected component labeling unit 238 labels the connected moving pixels in the determined moving pixels as the moving object and gathers the moving objects to form the first foreground detection image (S328). In detail, the connected component labeling unit 238 may calculate a number of moving pixels that are connected with each other and compare the number with a threshold, so as to determine whether to regard an area joined by the moving pixels as a moving object. When the calculated number of moving pixels is larger than or equal to the threshold, it represents that the area joined by the moving pixels is large enough to form an object, and therefore the connected component labeling unit 238 labels the area joined by the moving pixels as a moving object. On the contrary, when the calculated number of moving pixels is less than the threshold, it represents that the area joined by the moving pixels is too small to form an object, and therefore the connected component labeling unit 238 does not label the moving pixels as a moving object.

Back to the step S320 of FIG. 3, in the meantime that the processing device 220 of the present embodiment uses the moving object detection module 230 to perform the moving object foreground detection on each of the images in the video stream, it also uses a texture object detection module 240 to perform a texture object foreground detection on each of the images in the video stream, so as to obtain a second foreground detection image comprising a plurality of texture objects (S330). The texture object detection module 240 uses, for example, a characteristic of a local binary pattern of each pixel as the texture information of the pixel and establishes a dynamic texture model based on the local binary patterns of the pixels. The model can fast describe the moving objects lacking a texture in the image, so as to effectively resist the redundant moving objects resulted from natural phenomena.

Figure 6:
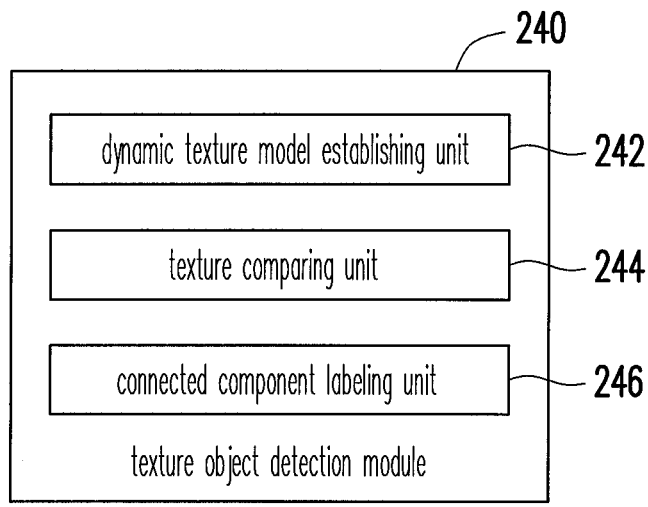
FIG. 6 is a block diagram of a texture object detection module according to one embodiment of the disclosure.
Figures 7, 8:
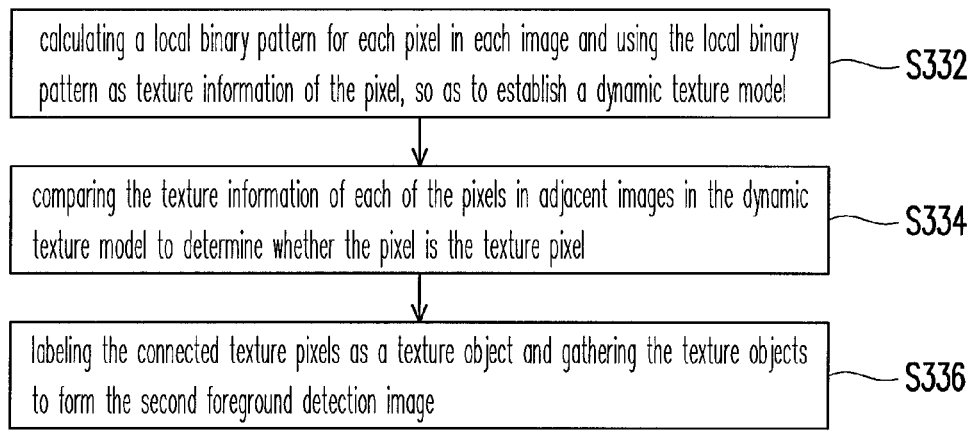
FIG. 7 is a flowchart illustrating a texture object detection method according to one embodiment of the disclosure.
FIGS. 8 (a) through 8(c) illustrate an example of establishing a dynamic texture model according to an embodiment of the disclosure.

In detail, FIG. 6 is a block diagram of a texture object detection module according to one embodiment of the disclosure, and FIG. 7 is a flowchart illustrating a texture object detection method according to one embodiment of the disclosure. Referring to both FIG. 6 and FIG. 7, the present embodiment separates the texture object detection module 240 in FIG. 2 into a dynamic texture model establishing unit 242, a texture comparing unit 244, and a connected component labeling unit 246, and functions thereof are respectively described as follows.

First, the dynamic texture model establishing unit 240 performs processing on a plurality of consecutive images in the head of the video stream that is sent to the moving object detection module 242, so as to establish a dynamic texture model. The dynamic texture model establishing unit 242 may respectively calculate a local binary pattern of each pixel in the images, and use the same as the texture information of the pixel, so as to establish the dynamic texture model (S322). In detail, the dynamic texture model establishing unit 242 may calculate differences between the pixel values of a plurality of neighboring pixels around a pixel and the pixel itself, classify the differences into two binary values through a dichotomy, and uses the result as the local binary pattern of the pixel.

Next, the texture comparing unit 244 compares the texture information of each of the pixels in adjacent images, so as to determine whether the pixel is a texture pixel (S334). In detail, the texture comparing unit 244 may calculate a number of the pixels that have different binary values in the local binary patterns of neighboring images and compare the number with a threshold, so as to determine whether the pixel is a texture pixel. When the number of pixels is larger than the threshold, it is determined that the pixel is a texture pixel.

For instance, FIGS. 8(*a*) through 8(*c*) illustrate an example of establishing a dynamic texture model according to one embodiment of the disclosure. The present embodiment calculates a grey level from the pixel value of each pixel in the image and uses the grey levels of the pixels to perform the texture object foreground detection and establish the dynamic texture model. Take a pixel 800 in the FIG. 8(*a*) as an example, the embodiment respectively subtracts the grey levels of eight pixels around the pixel 800 from the grey level of the pixel 800 itself to obtain a difference pattern 810 as shown in FIG. 8(*b*). Next, the differences in the difference pattern 810 are classified into binary values 0 and 1 through a dichotomy. The dichotomy, for example, calculates an absolute value of each difference and compares the absolute value of difference with a threshold (e.g. 0). Wherein, the absolute value of difference is labeled by the binary value 0 if being less than the threshold and is labeled by the binary value 1 if being larger than or equal to the threshold, so as to obtain a local binary pattern 820 as shown in FIG. 8(*c*). The local binary pattern 820 is then used as the texture information of the pixel in the image. Finally, the texture information of each pixel in each image of the video stream can be gathered to establish the dynamic texture model.

It should be noted herein that, in determining whether the pixel 800 is a texture pixel or not, the process may start from the pixel in an upper-left corner of the local binary pattern 820 and retrieve the binary values of the eight pixel around the pixel 800 in a clockwise direction from the local binary pattern 820, so as to obtain a binary sequence 00101010 of the pixel 800. Next, the binary sequence 00101010 is then compared with the binary sequence of corresponding pixel in a next image (e.g. 10011000), so as to get a number of pixels having different binary values is 4. Finally, the number of pixels is compared with a threshold, so as to determine whether the pixel 800 is a texture pixel or not. The aforesaid threshold is, for example, a half of a total number of pixels in the binary sequence or other predetermined value, which is not limited herein.

After the texture pixels are determined through aforesaid steps, the connected component labeling unit 246 labels the connected texture pixels in the determined texture pixels as the texture object and gathers the texture objects to form the second foreground detection image (S336). The connected component labeling unit 246 may calculate a number of texture pixels that are connected with each other and compares the number with a threshold, so as to determine whether to label an area joined by the texture pixels as a texture object. The comparison performed by the connected component labeling unit 246 is similar to the connected component labeling unit 238 as described in the above embodiment, thus will not be repeated herein.

Back to step S330 of FIG. 3, after the moving object foreground detection and the texture object foreground detection are completed, the processing device 220 further uses the object filtering module 230 to filter the moving objects in the first foreground detection image and the texture objects in the second foreground detection image (S340), and output the remaining moving objects or texture objects as the moving object information (S350). In detail, the object filtering module 230 takes use of the results of aforesaid two foreground detections and compares the positions of moving objects in the first foreground detection image with the positions of texture objects in the second foreground detection image, so as to select the desired objects. According to the difference among the surveillance environments, the areas that the objects exist can be classified into, for example, the texture objects resulting from natural phenomena and the moving objects not resulting from natural phenomena.

If the object to be detected is the moving object not resulting from natural phenomena, the object filtering module 230 filters out the moving objects in the first foreground detection image having the positions overlapped with the positions of the texture objects and uses the remaining moving objects after the filtering as a final result of object detection. On the contrary, if the object to be detected is the texture object resulting from natural phenomena, the object filtering module 230 filters out the texture objects in the second foreground detection image having the positions overlapped with the positions of the moving objects and uses the remaining texture objects after the filtering as a final result of object detection. Regarding an aspect of moving object detection, an embodiment is given below for further illustration.

Figure 9:
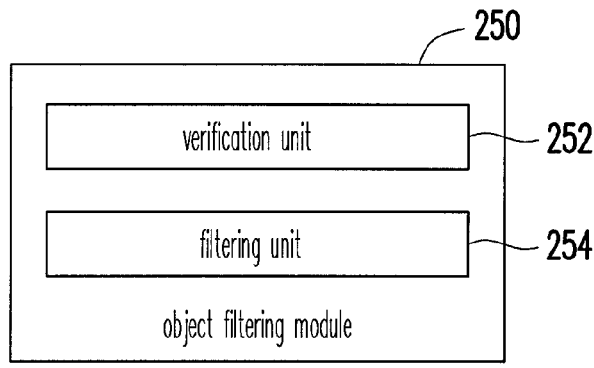
FIG. 9 is a block diagram of an object filtering module according to one embodiment of the disclosure.
Figure 10:
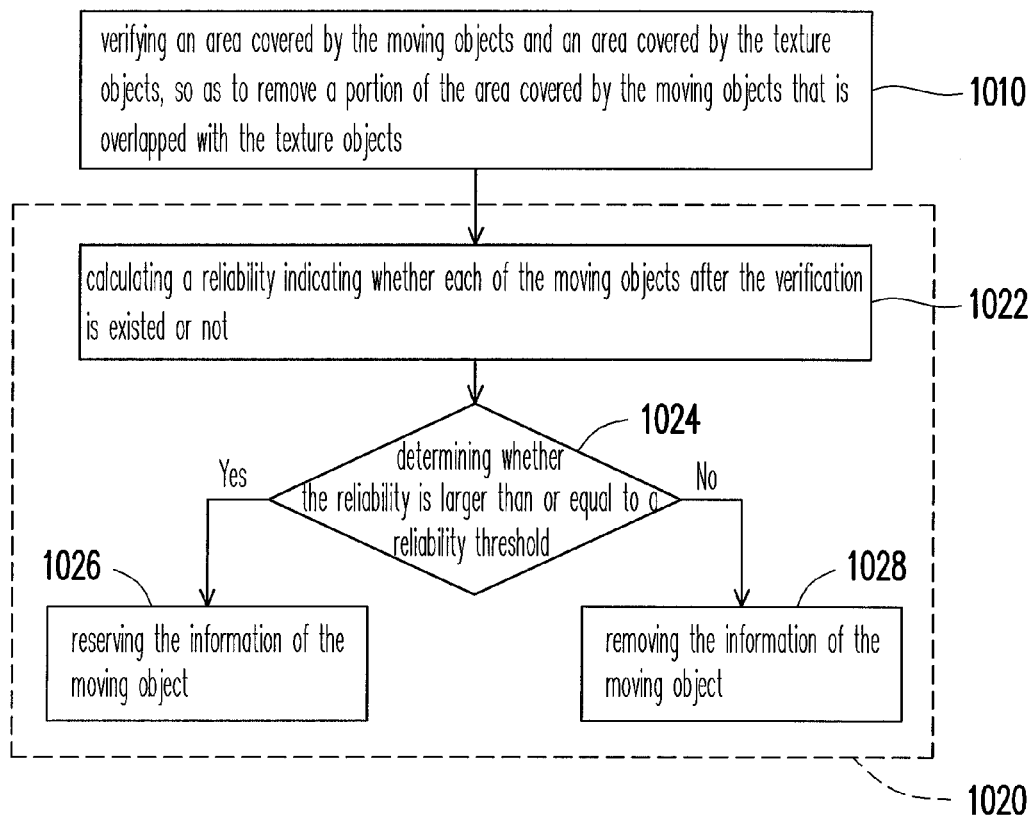
FIG. 10 is a flowchart illustrating an object filtering method according to one embodiment of the disclosure.

FIG. 9 is a block diagram of an object filtering module according to one embodiment of the disclosure, and FIG. 10 is a flowchart illustrating an object filtering method according to one embodiment of the disclosure. Referring to both FIG. 9 and FIG. 10, the present embodiment separates the object filtering module 250 in FIG. 1 into a verification unit 252 and a filtering unit 254, and functions thereof are respectively described as follows.

First, the verification unit is used for verifying an area covered by the moving objects and an area covered by the texture objects, so as to remove a portion of the area covered by the moving objects that is overlapped with the texture objects. In detail, if the area covered by the moving objects is overlapped with the texture objects, it represents that the moving object has a texture and it is reasonable to determine that the moving object is resulted from natural phenomena. At this time, the verification 252 only needs to remove the overlapped portion and then the remaining moving objects are the desired real moving objects.

Next, the filtering 254 filters the remaining moving objects according to the area covered by the moving objects after the verification (S1020). This step can be further divided into following sub steps. The filtering unit 254 may first calculate a reliability indicating whether each of the moving objects after the verification is existed or not (S1022), in which the reliability is, for example, a number of moving pixels included in each of the remaining moving objects. Next, the filtering unit 254 compares the calculated reliabilities with a reliability threshold, so as to determine whether the reliability larger than or equal to the reliability threshold (S1024), that is, to determine whether the moving object is really existed and to decide whether to reserve the moving object.

When the calculated reliability is larger than or equal to the reliability threshold, the corresponding moving object is regarded as existed and the filtering unit 254 reserves the information of the moving object (S1026). On the contrary, when the calculated reliability is less than the reliability threshold, the corresponding moving object is regarded as not existed and the filtering unit 254 removes the information of the moving object (S1028).

Figure 11:
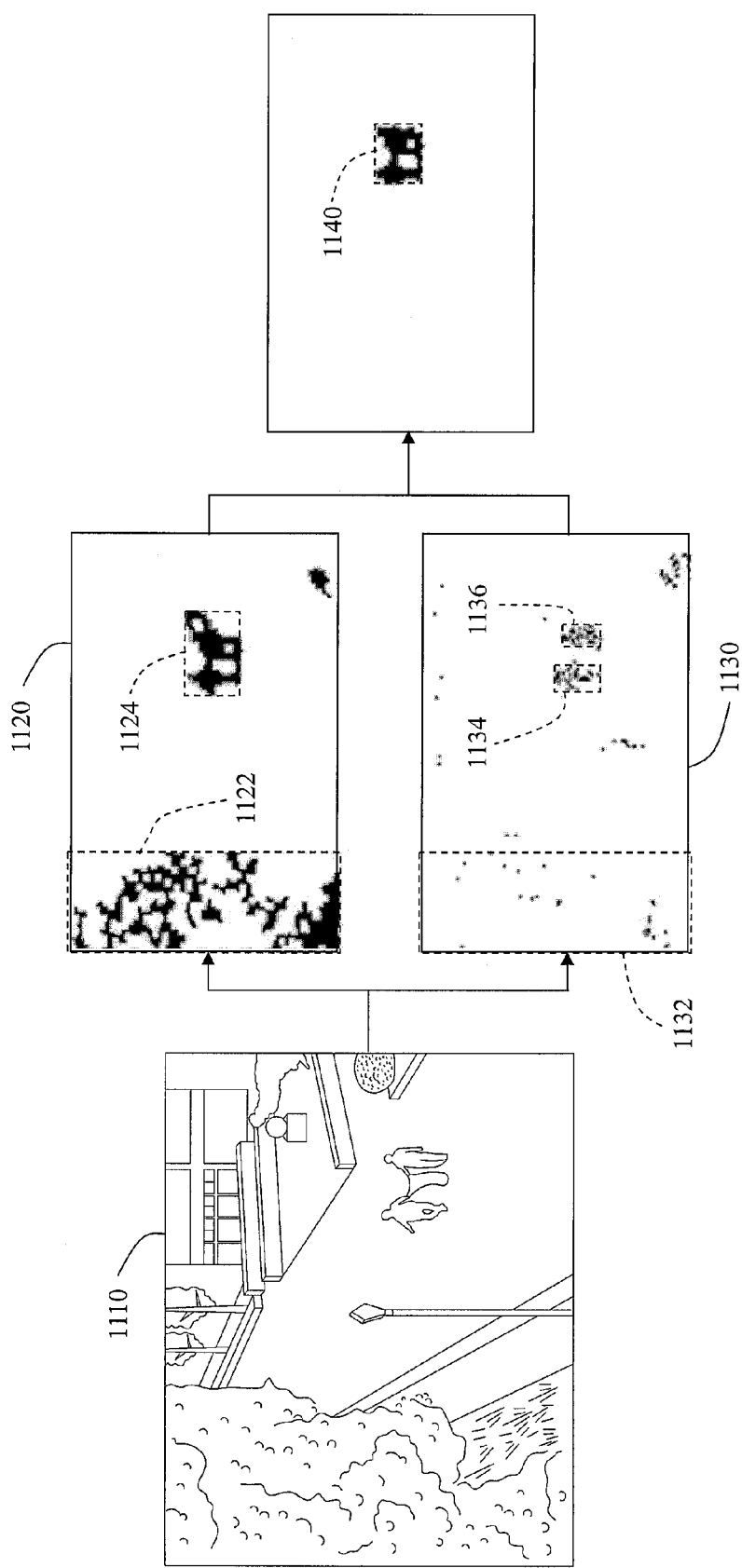
FIG. 11 is an example illustrating an object filtering method according to one embodiment of the disclosure.

FIG. 11 is an example illustrating an object filtering method according to one embodiment of the disclosure. Referring to FIG. 11, the present embodiment uses the image 1110 in a video stream as an example to illustrate detailed steps of aforesaid object filtering method. Wherein, a moving object foreground detection is performed on the image 1110 to obtain a foreground detection image 1120, in which the black area represents the detected moving objects. On the other hand, a texture object foreground detection is performed on the image 1110 to obtain a foreground detection image 1130, in which the black area therein represents the detected texture objects.

When performing the object filtering, the moving object information in the foreground detection image 1120 is, for example, used as a main output of moving object information. The texture object information in the foreground detection image 1130 is used as a basis to filter out the moving objects not resulting from natural phenomena in the foreground detection image 1120. For example, the moving object 1122 in the foreground detection image 1120 is overlapped with the texture object 1132 in the foreground detection image 1130. Therefore, when performing the object filtering, the moving object 1122 in the foreground detection image 1120 is removed. Similarly, a portion of the moving object 1124 in the foreground detection image 1120 is also overlapped with the texture objects 1134 and 1136 in the foreground detection image 1130. Therefore, when performing the object filtering, the portion of the moving object 1122 in the foreground detection image 1120 that is overlapped with the texture objects 1134 and 1136 is removed. Finally, the remaining moving object 1124 after the filtering is output as real moving object information 1140.

It should be noted herein that, after the moving object information in the video stream is detected through aforesaid object detection method, the disclosure further performs a series of object labeling and filtering mechanisms, such as position calculation of a principal axis and a ground point of the object, noise filtering, shadow removing, so as to establish a robust multi-target object detection system with high detection accuracy.

Based on the above, the object detection method and the object detection system of the disclosure establishes a background probability model and a dynamic texture model and uses the same to detect the moving objects and texture objects in the video stream, so as to further determine the objects resulted from natural phenomena or not from natural phenomena. By removing the redundant moving objects resulted from natural phenomena, an accuracy of object detection in a crowd scene can be increased.

It will be apparent to those skilled in the art that various modifications and variations can be made to the structure of the disclosure without departing from the scope or spirit of the invention. In view of the foregoing, it is intended that the disclosure cover modifications and variations of this invention provided they fall within the scope of the following claims and their equivalents.

What is claimed is:

1. An object detection method, suitable for detecting moving objection information of a video stream comprising a plurality of images, the method comprising:
    performing a moving object foreground detection on each of the images to obtain a first foreground detection image comprising a plurality of moving objects;
    performing a texture object foreground detection on each of the images to obtain a second foreground detection image comprising a plurality of texture objects; and
    filtering the moving objects in the first foreground detection image and the texture objects in the second foreground image, and outputting the remaining moving objects or texture objects after the filtering as the moving object information,
    wherein the step of performing the texture object foreground detection on each of the images to obtain the second foreground detection image comprising the plurality of texture objects comprises:
    for a plurality pixels in the consecutive images calculating a local binary pattern for each pixel in each image and using the local binary pattern as texture information of the pixel;
    comparing the texture information of each of the pixels in adjacent images to determine whether the pixel is a texture pixel; and labeling the texture pixels which are connected as the texture object and gathering the texture objects to form the second foreground detection image.

2. The object detection method according to claim 1, wherein the step of performing the moving object foreground detection on each of the images to obtain the first foreground detection image comprising the plurality of moving objects comprises:
establishing a background probability model by using a plurality of consecutive images in the video stream; and
performing the moving object foreground detection on other images by using the background probability model to obtain the first foreground detection image.

3. The object detection method as according to claim 2, wherein the step of establishing the background probability model by using the plurality of consecutive images in the video stream comprises:
for a plurality of pixels in the consecutive images calculating a mean and a variation of pixel values of each pixel in the images; and
establishing the background probability model by using the mean and the variation of each of the pixels, and using the background probability model to perform the moving object foreground detection on other images.

4. The object detection method according to claim 2, wherein the step of performing the moving object foreground detection on other images by using the background probability model to obtain the first foreground detection image comprises:
placing a plurality of color characteristics of each of the pixels in the background probability model for comparison to obtain a plurality of comparison results;
voting for the comparison results to determine whether the pixel is a moving pixel; and
labeling the moving pixels which are connected as the moving object and gathering the moving objects to form the first foreground detection image.

5. The object detection method according to claim 4, wherein the step of labeling the moving pixels which are connected as the moving object further comprising:
calculating a number of the connected moving pixels and comparing the number with a threshold;
labeling the connected moving pixels as the moving object when the calculated number of the connected moving pixels is larger than or equal to the threshold; and
not labeling the connected moving pixels as the moving object when the calculated number of the connected moving pixels is less than the threshold.

6. The object detection method according to claim 1, wherein the step of calculating the local binary pattern for each pixel in each image comprises:
calculating differences between a plurality of neighboring pixels around the pixel and the pixel itself; and
classifying the differences into two binary values by using a dichotomy to form the local binary pattern of the pixel.

7. The object detection method according to claim 1, wherein the step of comparing the texture information of each of the pixels in adjacent images to determine whether the pixel is the texture pixel comprises:
calculating a number of the pixels having different binary values in the local binary patterns of neighboring images and comparing the number with a threshold; and
determining that the pixel is the texture pixel when the number of pixels is larger than the threshold.

8. The object detection method according to claim 1, wherein the step of labeling the texture pixels which are connected as the texture object further comprising:
calculating a number of the connected texture pixels and comparing the number with a threshold;
labeling the connected texture pixels as the texture object when the calculated number of the connected texture pixels is larger than or equal to the threshold; and
not labeling the moving pixels as the texture object when the calculated number of the connected texture pixels is less than the threshold.

9. The object detection method according to claim 1, wherein the step of filtering the moving objects in the first foreground detection image and the texture objects in the second foreground image, and outputting the remaining moving objects or texture objects after the filtering as the moving object information comprises:
filtering out the moving objects in the first foreground detection image having positions overlapped with the texture objects in the second foreground image, and outputting the remaining moving objects after the filtering as the moving object information.

10. The object detection method according to claim 9, wherein the step of filtering out the moving objects in the first foreground detection image having positions overlapped with the texture objects in the second foreground image comprises:
verifying an area covered by the moving objects and an area covered by the texture objects, so as to remove a portion of the area covered by the moving objects that is overlapped with the texture objects; and
filtering the moving objects according to the verified area covered by the moving objects.

11. The object detection method according to claim 9, wherein the step of filtering the moving objects according to the verified area covered by the moving objects comprises:
calculating a reliability indicating whether each of the moving objects after the verification is existed or not; and
filtering the moving objects according to the calculated reliabilities.

12. The object detection method according to claim 11, wherein the reliability used for determining whether the moving object is existed or not comprises a number of the moving pixels in the moving object.

13. The object detection method according to claim 12, wherein the step of filtering the moving objects according to the calculated reliabilities comprises:
comparing each of the calculated reliabilities with a reliability threshold;
regarding the moving object as existed and reserving the information of the moving object when the corresponding reliability is larger than or equal to the reliability threshold; and
regarding the moving object as not existed and removing the information of the moving object when the corresponding reliability is less than the reliability threshold.

14. The object detection method according to claim 1, wherein the step of filtering the moving objects in the first foreground detection image and the texture objects in the second foreground image, and outputting the remaining moving objects or texture objects after the filtering as the moving object information comprises:
filtering out the texture objects in the second foreground detection image having positions overlapped with the moving objects in the first foreground image, and outputting the remaining texture objects after the filtering as the moving object information.

15. The object detection method according to claim 1, wherein before the step of performing the moving object foreground detection and the texture object foreground detection on each of the images, the method further comprises:

reducing a resolution of each of the images and performing the moving object foreground detection and the texture object foreground detection on each of the images having a reduced resolution.

16. A non-transitory computer-readable medium encoded with a computer program comprising:

a moving object detection module, performing a moving object foreground detection on each of a plurality of images in a video stream captured by an image capturing device to obtain a first foreground detection image comprising a plurality of moving objects;

a texture object detection module, performing a texture object foreground detection on each of the images to obtain a second foreground detection image comprising a plurality of texture objects; and an object filtering module, filtering the moving objects in the first foreground detection image and the texture objects in the second foreground image, and outputting the remaining moving objects or texture objects after the filtering as the moving object information, wherein the texture object detection module comprises:

a dynamic texture model establishing unit, a plurality of pixels in the consecutive images calculating a local binary pattern for each pixel in each image and using the local binary pattern as texture information of the pixel;

a texture comparing unit, comparing the texture information of each of the pixels in adjacent images to determine whether the pixel is a texture pixel; and a connected component labeling unit, labeling the texture pixels which are connected as the texture object and gathering the texture objects to form the second foreground detection image.

17. The non-transitory computer-readable medium according to claim 16, wherein the moving object detection module comprises:

a background probability model establishing unit, a plurality of pixels in the consecutive images calculating a mean and a variation of the pixel values of each pixel in the images; and a characteristic comparing unit, placing a plurality of color characteristics of each of the pixels in the background probability model for comparison to obtain a plurality of comparison results;

a voting unit, voting for the comparison results obtained by the characteristic comparing unit to determine whether the pixel is a moving pixel; and a connected component labeling unit, labeling the connected moving pixels as the moving object and gathering the moving objects to form the first foreground detection image.

18. The non-transitory computer-readable medium according to claim 16, wherein the object filtering module comprises filtering out the moving objects in the first foreground detection image having positions overlapped with the texture objects in the second foreground image, and outputting the remaining moving objects after the filtering as the moving object information.

19. The non-transitory computer-readable medium according to claim 16, wherein the object filtering module comprises:

a verification unit, verifying an area covered by the moving objects and an area covered by the texture objects, so as to remove a portion of the area covered by each of the moving objects that is overlapped with the texture objects; and a filtering unit, filtering the moving objects according to the area covered by the moving objects verified by the verification unit.

20. The non-transitory computer-readable medium according to claim 19, wherein the filtering unit comprises calculating a reliability indicating whether each of the moving objects after the verification is existed or not, and filtering the moving objects according to the reliabilities.

21. The non-transitory computer-readable medium according to claim 20, wherein the reliability used for determining whether the moving object is existed or not comprises a number of the moving pixels in the moving object.

22. The non-transitory computer-readable medium according to claim 16, wherein the object filtering module comprises filtering out the texture objects in the second foreground detection image having positions overlapped with the moving objects in the first foreground image, and outputting the remaining texture objects after the filtering as the moving object information.

23. The non-transitory computer-readable medium according to claim 16, wherein the image capturing device further comprises reducing a resolution of each of the images in the captured video stream and providing the images having a reduced resolution for the processing device to perform the moving object foreground detection and the texture object foreground detection.

* * * * *

UNITED STATES PATENT AND TRADEMARK OFFICE
CERTIFICATE OF CORRECTION

| | | |
|---|---|---|
| PATENT NO. | : 8,559,670 B2 | Page 1 of 1 |
| APPLICATION NO. | : 12/700706 | |
| DATED | : October 15, 2013 | |
| INVENTOR(S) | : Jian-Cheng Wang et al. | |

It is certified that error appears in the above-identified patent and that said Letters Patent is hereby corrected as shown below:

On the Title Page, item (54) and in the Specification, Column 1, Line 1-3, Title, "A MOVING OBJECT DETECTION DETECTION WITHIN A VIDEO STREAM USING OBJECT TEXTURE" should be changed to -- MOVING OBJECT DETECTION WITHIN A VIDEO STREAM USING OBJECT TEXTURE --.

Signed and Sealed this
Fourth Day of February, 2014

Michelle K. Lee
*Deputy Director of the United States Patent and Trademark Office*